(No Model.)
2 Sheets—Sheet 1.
C. T. RYLAND, Jr.
VELOCIPEDE.
No. 342,467. Patented May 25, 1886.
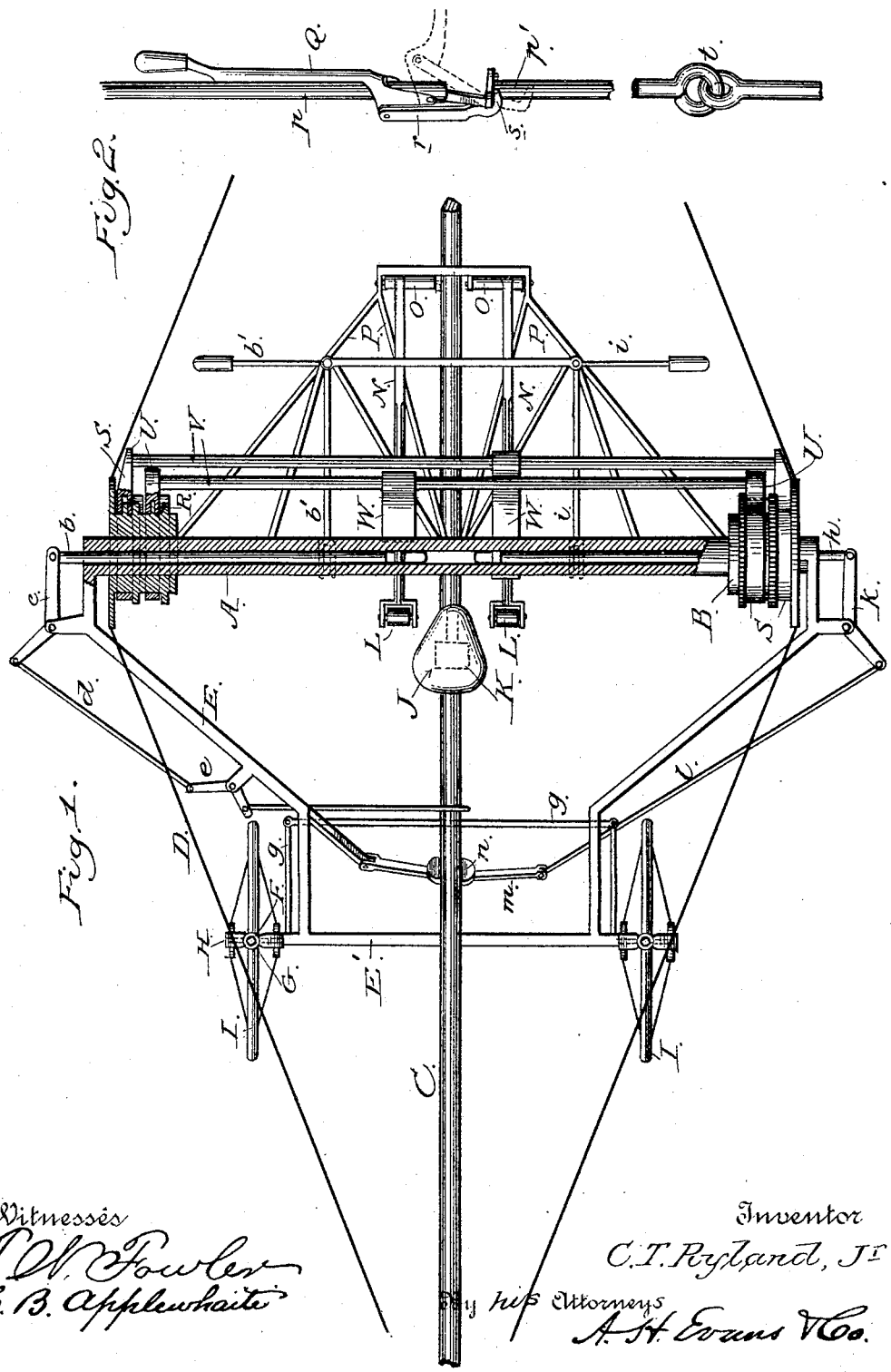
Witnesses
T. W. Fowler
H. B. Applewhaite
Inventor
C. T. Ryland, Jr.
by his Attorneys
A. H. Evans & Co.

(No Model.) 2 Sheets—Sheet 2.
C. T. RYLAND, Jr.
VELOCIPEDE.
No. 342,467. Patented May 25, 1886.
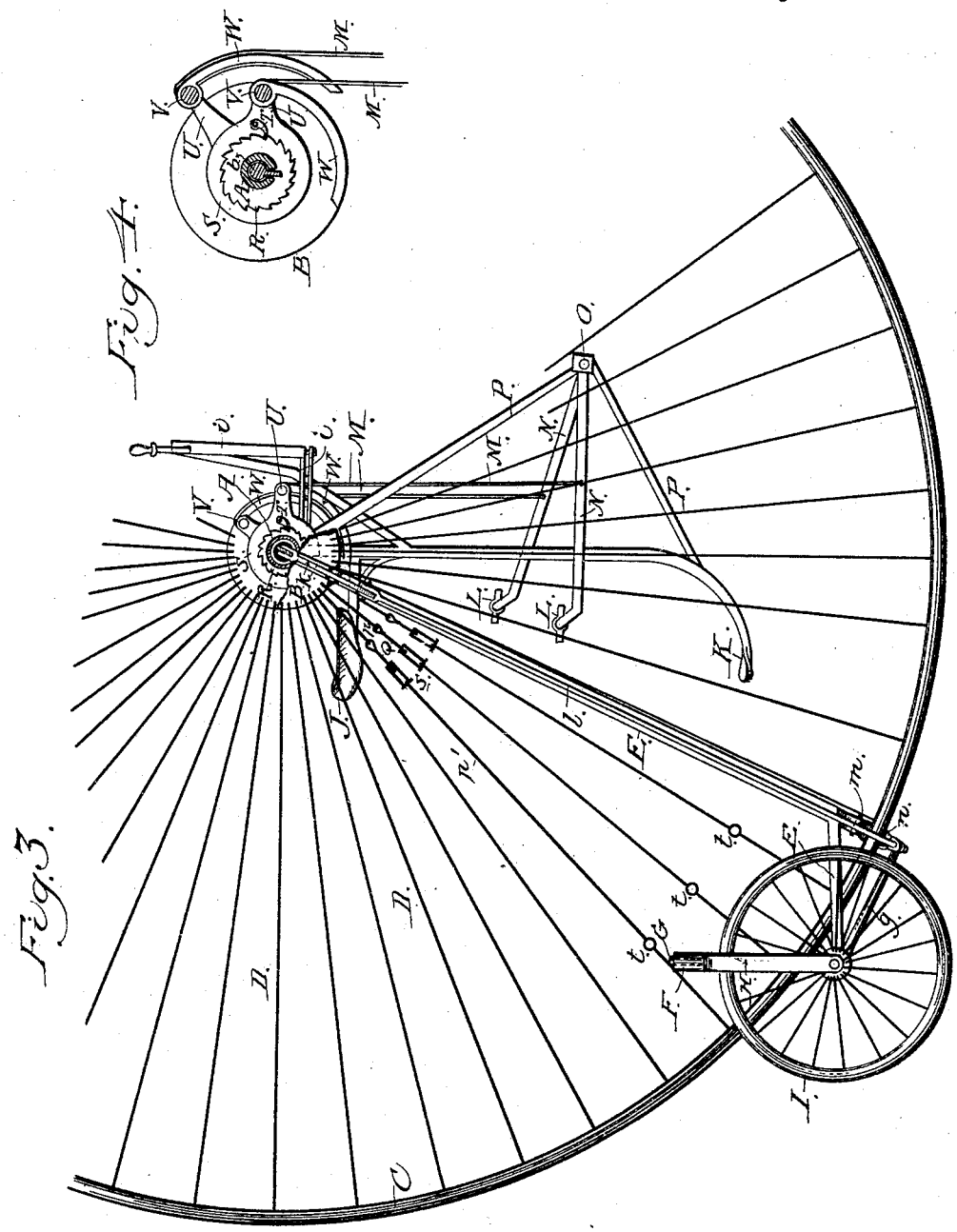

UNITED STATES PATENT OFFICE.

CAIUS T. RYLAND, JR., OF SAN JOSÉ, CALIFORNIA.

VELOCIPEDE.

SPECIFICATION forming part of Letters Patent No. 342,467, dated May 25, 1886.

Application filed January 16, 1886. Serial No. 188,724. (No model.)

*To all whom it may concern:*

Be it known that I, CAIUS T. RYLAND, Jr., of San José, Santa Clara county, State of California, have invented an Improvement in Tricycles; and I hereby declare the following to be a full, clear, and exact description of the same.

My invention relates to certain improvements in velocipedes, or machines which are driven by the power of the rider.

It consists of a single large wheel having a seat and operating mechanism supported from the axle within the wheel, two smaller tiller or steering wheels with a connecting-frame by which they are supported just outside the rim of the main wheel, a ratchet mechanism for driving the main wheel and pedals connected therewith, a hollow shaft with rods by which the brake and steering mechanism may be operated, and jointed spokes in the main wheel which may be separated for the ingress and egress of the rider, together with certain details of construction, all of which will be more fully explained by reference to the accompanying drawings, in which—

Figure 1 is a horizontal section taken through the axle and hubs of the large wheel, showing a plan view of the seat, pedals, and steering-wheels. Fig. 2 is an enlarged view of the spoke-opening mechanism. Fig. 3 is a side elevation of a portion of the large wheel, showing the pedals, seat, steering-wheel, and a section of one of the driving ratchet-wheels. Fig. 4 is a detail view of the driving mechanism.

A is the axle of the large wheel of my machine, which is made hollow, and of sufficient length to allow the seat and driving mechanism to be supported from it between the hubs and within the wheel.

B are the hubs of the wheel.

C is the rim, and D are the spokes, which are preferably made of stout steel wire in the usual manner of constructing such wheels.

E is the frame, the side bars of which have their ends secured to the ends of the axle A, outside the hubs B of the wheel. These side bars approach each other, passing downward and being bent or curved backward at their lower ends, where they are united with the frame E', at the upper end of which are fixed the steering-heads F, into which the spindles G of the small wheel-forks H enter.

I I are the small steering-wheels, the axles of which are fixed in the lower ends of the forks H. These wheels stand just outside and below the rim of the large wheel. This wheel is made of sufficient diameter, so that the rider may comfortably sit inside of it upon the seat J, which is supported upon an elastic spring from a frame connected with the axle A.

K is a step, from which the rider may reach his seat, the step being also supported from the axle.

L L are treadles fixed to or journaled in the ends of arms N, which have their fulcrums at O in a frame composed of bars P, which are supported from the axle, as shown.

In order to propel the machine I employ ratchet-wheels R, which are secured to the inwardly-extending portions of the hubs B, these ratchets being inclosed in casings S, having pawls T so fixed as to engage the ratchet-wheels, and having arms U projecting from them, as shown. To these arms U are secured the ends of vertically-vibrating horizontal bars V. These bars have fixed to them, at points in line above the treadle-levers M, the arcs W, so that the flexible cords a, which extend from the treadle-levers N upward, will pass around these arcs, fitting in grooves or channels made in their peripheries, so that as the bars V move up and down the cords will always be maintained at the same distance from the center, and will consequently act with equal power upon the wheel in whatever position the treadles and levers may be. A coil or other spring will be secured to the casings which surround the ratchets, or other suitable form of spring may be connected with the arms V, for the purpose of raising them up after they have been depressed by the action of the pedal-levers M, so that they are always ready for a new movement. From this construction it will be seen that the axle A is stationary and does not revolve, but that the wheel-hubs revolve upon the axle, and power is imparted to them and the wheel by means of the pawl and ratchet-wheels, vibrating bars, and the treadles.

In order to steer the machine a rod, b, extends inwardly through the hollow axle, and has its inner end connected through a slot in the axle with one arm of a hand-lever, $b'$, which is fulcrumed, so that by moving it forward or back or up or down, as may be desired, this rod $b$ will be forced outward or drawn inward. The outer end of the arm $b$ is connected with one end of a bell-crank lever, $c$. The other end of this lever is connected by a rod, $d$, with one end of another bell-crank lever, $e$, which is fulcrumed to the lower end of the main frame E. The opposite end of this bell-crank lever $e$ is connected with steering levers or tillers $g$, which are secured to the forks of the small steering-wheels I, before described. These wheels being independently journaled in the steering-heads, as previously shown, the action of this lever and connected mechanism will be to turn them from one side to the other upon their independent centers, and thus steer the machine in any desired direction.

In order to apply the brake to the large wheel when necessary, a rod, $h$, extends out through the opposite end of the axle A, and has its inner end connected with a hand-lever, $i$, through a slot in the axle. The outer end of the rod $h$ is connected with one arm of a bell-crank lever, $k$, and the opposite end of this lever is connected by a rod, $l$, with an arm, $m$, at the lower end. The opposite end of this arm is pivoted to the main frame, and its central portion carries a brake-shoe, $n$, which, when the levers are operated, will be pressed against the tire of the large wheel, thus checking its movement. By this construction I provide a sufficient means for propelling, guiding, and checking the large wheel, which is practically the whole of the machine.

The small wheels I are set sufficiently wide apart to support the machine while the rider is getting into it.

In order to get into the wheel, it is necessary to temporarily remove one or two of the spokes from one side, and this is done by making the spokes into two parts, $p\ p'$. The adjacent ends of these spokes have connected with them a mechanism, by which they may be drawn tight and practically made one. It consists of a lever, Q, fulcrumed to the end of the spoke $p$, and having a hook-shaped arm, $r$, one end of which is pivoted to this lever, as shown, while the other end or hook portion is clasped beneath the head of the spoke $p'$, as shown at $s$. It will be seen from this construction that when the lever is thrown down the hook will be released, and the spoke $p'$, having a joint, as shown at $t$, may be turned out of the way, so as to allow the rider to get in or out of the wheel. After this the part $p'$ may be turned up and the hook $s$ clasped beneath the head of the spoke, after which the lever Q is thrown up, thus drawing the spoke together with sufficient tension, and, as the point at which the hooked arm $r$ is pivoted to the lever is thrown outside of the fulcrum of the lever, the strain upon it will hold it without any other fastening.

Having thus described my invention, what I claim as new, and desire to secure by Letters Patent, is—

1. A wheel having a centrally-arranged seat or saddle and propelling mechanism supported from a stationary axle about which the wheel revolves, in combination with a frame secured to the outer ends of the stationary axle, extending downward and backward and having heads, within which are journaled the steering-centers of the two smaller wheels, substantially as herein described.

2. The stationary hollow axle from which the seat and propelling mechanism are centrally supported within a wheel, the hubs of which turn about said axle, and smaller wheels, the forks of which are provided with independent vertical steering-centers, in combination with a rod extending outwardly through one end of the hollow axle, a handle or lever-arm connected with said rod through a slot in the axle, bell-crank levers, connecting-rod and steering levers or tillers, by which motion is communicated from the hand-lever and sliding rod to the steering-wheel, substantially as herein described.

3. The stationary hollow axle, from which the seat and driving mechanism are supported within a wheel, the hubs of which turn upon said axle, a frame connected with the outer ends of said axle and extending thence to the steering-wheels, which have their centers journaled therein, in combination with a rod sliding through one end of the axle, a lever by which said rod is moved inward or outwardly, and bell-crank levers and connecting-rod, by which the motion of this sliding rod is communicated to a brake-lever carrying a shoe, which may be pressed against the wheel to check its motion, substantially as herein described.

4. A stationary axle, the extending frame, the small steering-wheels mounted in said frame, and a larger wheel the hubs of which turn upon the stationary axle, in combination with ratchet-wheels upon the hubs, pawl-carrying levers, flexible cords connected therewith at one end and having the opposite ends connected with treadles, whereby motion may be transmitted to the wheel, substantially as herein described.

5. A wheel having a seat and vertically-moving treadles supported from the stationary axle within the wheel, the hubs of which turn loosely upon said axle, in combination with ratchets fixed to the hubs, levers carrying pawls which operate upon the ratchets, and returning-springs, together with vibrating bars V V, uniting the pairs of ratchets upon the two hubs, and the cords connecting said bars with the treadle-levers, substantially as herein described.

6. The wheel-hubs having the ratchet-wheels fixed to them, the lever-arms carrying pawls which engage the ratchets and having springs by which they are raised after being depressed, the horizontal vibrating bars V, connecting the pairs of ratchets and operating-levers upon the two wheel-hubs, in combination with the curved arcs fixed to the bars V, the flexible cords fitting grooves in these arcs and connecting with the treadle-levers, by which the ratchets are operated, substantially as herein described.

7. The jointed two-part spokes, one part having a head formed upon it and the other carrying an angle or bell-crank lever, in combination with a connecting-hook, one end of which is pivoted to the bell-crank lever and the other fitted to engage the head of the opposite portion of the spoke, substantially as herein described.

In witness whereof I have hereunto set my hand.

CAIUS T. RYLAND, Jr.

Witnesses:
GEO. H. STRONG,
S. H. NOURSE.